United States Patent [19]

Katayama et al.

[11] 3,950,550
[45] Apr. 13, 1976

[54] FRIED TOFU PRODUCT AND METHOD FOR MAKING THE SAME

[75] Inventors: Tsutomu Katayama, Osaka; Yoshiro Ishiwatari, Ashiya, both of Japan

[73] Assignee: Fuji Oil Co., Ltd., Osaka, Japan

[22] Filed: Dec. 4, 1974

[21] Appl. No.: 529,442

[30] Foreign Application Priority Data
Dec. 6, 1973    Japan.............................. 48-139159

[52] U.S. Cl. .................. 426/94; 426/138; 426/283; 426/391; 426/441; 426/601; 426/613; 426/656; 426/657
[51] Int. Cl.² .......................... A23J 3/00; A23L 1/34
[58] Field of Search ............. 426/94, 138, 145, 148, 426/196, 202, 211, 283, 284, 348, 362, 364, 441, 391, 601, 613, 656, 657

[56] References Cited
OTHER PUBLICATIONS
Smith et al., "Soybeans: Chemistry and Technology," Vol. 1, Proteins, pp. 376–379.

*Primary Examiner*—James R. Hoffman

[57] ABSTRACT

A fried tofu product, such as "aburage", "ganmodoki", "aburage casing" and "jointless aburage casing", is prepared without coagulants normally used in conventional processes for making tofu by forming a kneaded soy proteinaceous material or soy protein dough from a heat coagulable soy protein, shaping the protein dough into a desired shape (e.g., thin sheet, rounded disc, or tubular) and deep frying the shaped material in two successive stages. Egg components and/or edible oils or fats can be incorporated into the protein dough to improve the texture, taste and/or food value of the fried product.

24 Claims, No Drawings

FRIED TOFU PRODUCT AND METHOD FOR MAKING THE SAME

BACKGROUND OF THE INVENTION

This invention relates to fried tofu products and processes for making same.

"Tofu" is one of the most popular traditional soybean foods in Eastern Asia and is an important protein source for people living in this region. It is a watery, white, jelly-like fragile product having a moisture content as high as 88 weight %. In most cases, tofu is prepared by complicated manual processes. In a typical process, soybeans, as the raw material, are soaked in water for prolonged periods, (e.g., about 8 hours during the summer months and about 22–24 hours during the winter months) and the soaked soybeans are ground to form a slurry thereof. This slurry is heated to extract the soy protein (i.e., the soy protein becomes dissolved in the water phase) and then filtered through a coarse cloth to remove insoluble soybean refuge, consisting mainly of pulverized cellular substances commonly like "okara". The filtrate or soy milk is coagulated to form a curd by adding a coagulating agent, such as a non-toxic water soluble alkaline earth metal salt (e.g., calcium sulfate, calcium chloride or magnesium chloride) and the whey is separated from the tofu curd by draining. In recently developed processes, certain organic gamma or delta lactones of aldonic and uronic acids, such as D-glucono-δ-lactone, are used as the coagulating agent and the necessity for whey draining is eliminated. Notwithstanding this improvement, prior processes used for making tofu still require many laborious, time-consuming steps and generally are not adaptable for automated mass production.

Tofu is used as a foodstuff in several different forms. In Eastern Asia, it is commonly consumed as a fried product. Today, about one third of the tofu consumed in Japan is in this form.

"Aburage" (often referred in shortened form as "age") is one of the most common forms of fried tofu. It is generally square shaped and is prepared by slicing tofu curd into relatively thin slices, pressing the slices to adjust the moisture content therein to about 80–82% and then deep frying in two successive stages. Aburage is consumed chiefly in a cooked state or in a toasted state with appropriate condiments and/or seasonings.

Occasionally, aburage is also consumed as an edible casing or wrapping for other foodstuffs. This aburage casing is prepared by diagonally cutting a square piece of the aburage to form two triangular pieces. Each triangular piece is then slit open along the cut edge to form a bag. "Sushi" is prepared by stuffing the aburage bags with various foodstuffs. For example, "inarizushi", a particular kind of "sushi", is prepared by stuffing the aburage bags with a vinegared rice. Daily dishes can be prepared by stuffing bags formed from aburage with various comminuted vegetables and fastening the stuffed bags with an edible string or cord, such as "kanpyo" (made from the fruits from certain convolvulacean and lagenarian plants). Aburage can be cut into two rectangular pieces, each of which are slit open along the cut edge to form a bag which is used in a similar manner.

Another type of fried tofu is "ganmodoki", also called "hirosu", which is prepared by crushing or grinding drained tofu curd, mixing a curd binder, such as dioscorean yams (e.g., *D. janponica thunb.* or *D. betatas decne.*), and minced vegetables with the ground tofu, forming this mixture into a rounded disc shape, and then deep frying the shaped mixture in two successive stages. The product is consumed in a manner similar to aburage.

Because of the laborious and time-consuming manual steps typically required by these methods for preparing fried tofu products, economical mass production of such products has not been possible in the past. Tofu formed by the lactone coagulants mentioned above generally are not acceptable for preparing a fried tofu product because of the difficulty of draining whey to reduce the moisture content to the desired level of 80–82%. Also, the tofu is acidifed by these coagulants and tends to reduce the flexibility of the fried product. Consequently, preparation of fried tofu products generally are restricted to the use of a tofu curd formed with an alkaline earth metal salt. The presence of these salts in the fried product has several disadvantages.

First, it is often desirable to freeze the fried fu products for prolonged storage. This is particularly true for ganmodoki which retains a considerable amount of moisture even after frying (because of its thickness as compared to the thin aburage) and therefore, tends to putrefy within a relatively short time unless frozen. While being stored in a frozen state, the alkaline earth metal salts present in the fried products tend to accelerate the denaturation of soy protein. This denaturation causes the thawed product to have a porous texture (i.e., honeycomb-like) and unsatisfactory mouthfeel or chewiness.

Second, unless extreme care is exercised during frying, these salts tend to leach out onto the frying oil and cause a deterioration thereof.

Third, it is desirable to incorporate egg ingredients (egg yolk, egg white, or whole egg) into the fried products to improve their flavor and/or food value. It is difficult to do this with prior processes, particularly when aburage is being prepared. If the egg ingredient is added to the heated soybean slurry prior to filtering, the egg protein may be filtered out with the soybean refuge because it tends to coagulate at temperatures below which the slurry must be heated to extract soy protein. If the egg ingredients are added to the soy milk before curd formation, some of the egg protein may not be coagulated by these salts and, consequently, is drained away along with the whey. Therefore, the above-discussed prior processes generally are not acceptable for preparing fried tofu products (particularly aburage) also containing egg ingredients.

SUMMARY OF THE INVENTION

A primary object of the invention is to provide a simplified process for preparing fried tofu products from soy protein without forming a tofu curd.

Another principal object of the invention is to provide a fried tofu product which can be stored frozen with minimum deterioration in texture and mouth feel.

A further principal object of the invention is to provide a fried tofu product which does not contain coagulants normally used in conventional processes for making tofu.

A still further principal object of the invention is to provide novel fried tofu products containing egg ingredients.

Other objects, aspects and advantages of the invention will become apparent upon reviewing the following detailed description and the appended claims.

In accordance with the invention, fried tofu products are prepared from a kneaded soybean proteinaceous material or soy protein dough rather than from a tofu curd formed by the use of conventional coagulating agents, thereby eliminating or minimizing the disadvantages discussed above.

More particularly, a kneaded mixture of soy protein and water, preferably also including an edible oil or fat, is prepared from a heat-coagulable soybean protein to form a protein dough, the protein dough is formed into the desired shape, and the shaped dough is deep fried in two successive stages.

DESCRIPTION OF THE PREFERRED EMBODIMENTS

The kneaded soy proteinaceous material (referred to herein as protein dough) which is formed into the desired shape and subsequently fried in accordance with the invention, essentially contains soy protein (consisting primarily of soya globulin) and water, and preferably also includes an edible oil or fat. In order to provide a pasty or plastic-like, homogeneous mass having a viscosity suitable for forming into desired shapes, the protein dough preferably is comprised of about 15 to 45 parts by weight of soy protein and 0 to 100 parts by weight of an edible oil or fat (when used), per 100 parts by weight of water. If the protein dough contains more than about 45 parts of soy protein per 100 parts of water, a pasty homogeneous mass can not be formed and the kneaded mass may include undissolved lumps of soy protein. On the other hand, if the protein dough contains much less than about 15 parts of soy protein per 100 parts of water the kneaded mass will not have a satisfactory viscosity to provide the paste-like consistency desired for molding or shaping and subsequent frying. The inclusion of an edible oil or fat in the protein dough enhances the taste and mouth feel of the fried product; however, amounts of same higher than about 100 parts per 100 parts of water makes it difficult to shape the protein dough. The most preferred amounts of the soy protein and edible oil or fat (when used) are about 20 to 40 parts and about 11 to 60 parts, respectively, per 100 parts of water.

The raw soy protein material used for making the kneaded protein dough can be either a dried or aqueous soy protein isolate, a curd of acid-precipitated soy protein or a soy protein concentrate from which either the soybean refuge or the soy whey has been removed.

In order to eliminate the necessity for using a curd binder, the soy protein contained in the protein dough preferably should be "heat coagulable". Determination as to whether or not a soy protein is heat coagulable (as the term is used herein) it is made in the following manner: (1) prepare an aqueous slurry containing 13 weight % of the soy protein, (2) pack or stuff the slurry into a cylindrical casing made from a suitable plastic material such as polyvinylidene chloride, polyethylene and polypropylene and having an inside diameter of 22 mm, (3) heat the stuffed casing in boiling water for 30 minutes, (4) cool the thus-cooked product, and (5) slice the resultant product with a sharp knife (generally perpendicularly to the longitudinal axis of the casing) into circular slices of about 3 mm thickness. If the resultant product is self-supporting and no part collapses upon being sliced, it is regarded as "heat coagulable".

If the soy protein used in forming the protein dough is not heat coagulable, it is difficult to shape the dough into the desired plastic-like, moldable mass without using a curd binder and the protein dough tends to disperse in the frying oil.

Soy protein can be made heat coagulable by a moderate heat treatment thereof either during preparation of the soy protein or during the kneading operation when the protein dough is being formed. In either case, this heat treatment is preformed in a manner so that the soy protein is not insolubilized or coagulated. This heat treatment can be carried out by heating the soy protein, as part of a solution or slurry, to a temperature within the range of about 80° to 140° C for about 1 to 30 minutes in a manner so as not to insolubilize or coagulate the soy protein. Generally, shorter heating periods are required for higher temperatures.

For example, a soy milk extracted from defatted or full fat soybean flour and containing 4–7 weight % soybean protein can be rapidly heated to a temperature of about 120°, held at that temperature for about 5 seconds, and then rapidly cooled to below 60° C or heated to a temperature of about 60° C for about 10 minutes.

Generally, any concentrated or spray-dried soybean protein can be used for the production of the protein dough; however, it is difficult to heat a slurry containing more than about 20% soy protein to a temperature over 100° C without causing some denaturation which induces undesired insolubilization or coagulation of the soy protein. When such a slurry or solution is used as part of the starting mixture for forming the protein dough, the heat treatment can be carried out by placing it in an apparatus which is capable of mixing and uniformly kneading the mixture and simultaneously heating the mixture to about 80° to 100° C. In this manner, both the kneading and heat treatment are effected in a single operation. As mentioned above, the soybean protein used in such as aqueous solution can be an acid precipitated soybean curd, a neutralized product of such a curd, or hydrated products of soybean proteinaceous flour.

Other additives (except the egg ingredients) such as an edible oil or fat or a starch (e.g., potato starch) can be introduced into the solution or slurry of soy protein so as to make an emulsion or a homogeneous mixture.

When the protein dough contains rather high contents of an edible oil or fat (within the range mentioned above), the soy protein, in addition to being heat coagulable, preferably should have relatively high emulsifying properties. An isolated soybean protein product produced by the method disclosed in U.S. Pat. No. 3,607,860 and marketed under the trade name "FUJI-PRO-R" by Fuji Oil Co., Ltd., Osaka, Japan is a representative example of a protein having both of these properties.

Egg ingredients, either the egg yolk, egg white or both, can be incorporated into the kneaded protein dough. The egg ingredients can be either in their natural form or dried form but should be undernatured. Inclusion of such egg ingredients in the kneaded protein dough adds color, luster, food value and/or taste to the final product and also provides the fried product with an expanded texture upon being deep fat fried. Egg protein is sensitive to heat and, above a temperature of about 70° C, tends to lose its ability to impart an expanded texture to the fried product. Therefore, such egg ingredients should be incorporated into the kneaded protein dough after the above described heat treatment.

When an egg ingredient is included, the kneaded protein dough preferably includes about 15 to 45 parts by weight of soybean protein, 0 to 100 parts by weight of an edible oil or fat and about 1 to 10 parts by weight of the egg ingredient, as egg protein, per 100 parts by weight of the water included in the mixture. Egg protein contents lower than about 1 part does not significantly enhance the properties of the fried product while contents above about 100 parts effectively eliminates the function of the soy protein.

Various suitable seasonings, condiments, and minced vegetables can be incorporated into the kneaded protein dough if desired. While a curd binder is not required when a heat coagulable soybean protein is used, various edible binders can to be used if desired.

After the kneaded protein dough has been prepared, it is formed into the desired shape for frying, such as by molding, stamping or the like. For example, aburage can be prepared in the following manner. The kneaded protein dough is formed with an extruder or calender into a thin sheet having a thickness of about 2 to 20 mm, preferably about 3 to 8 mm. When the sheet thickness is less than about 2 mm the fried product generally lacks the flexibility desired for aburage. On the other hand, when the sheet thickness is more than about 20 mm, the inner portion thereof does not become expanded during frying. The sheet is cut into the desired size and shape for use as aburage prior to frying.

Whereas the size of traditional aburage made from conventionally processed tofu is restricted somewhat because of the fragile nature of tofu, the kneaded protein dough prepared in accordance with the invention can be formed into long, continuous forms, such as by conventional film extrusion apparatus. Thus, various process steps including the heat treatment, dough formation, dough shaping, and frying can be automatically and continuously preformed with minimum manpower.

When ganmodoki is the desired fried tofu product, the kneaded protein dough is formed into a rounded disc shape of adequate size to be eaten.

A variety of new types of fried tofu products can be produced from the kneaded protein dough. For instance, tubular aburage casings can be produced on a continuous basis by extruding the kneaded protein dough through an annular die opening of an auger-type extruder and introducing the extrudate directly into one or more deep frying tanks containing a frying oil at the desired temperatures. The die opening is sized to produce the desired outer diameter and wall thickness of the casing, which preferably is within the range of about 2 to 8 mm. The thus-formed fried aburage casing does not have to be pierced to introduce foodstuffs as is the case with traditionally prepared aburage casings. It has been found that fried tubular aburage casing formed in this manner can be heat sealed with conventional heat sealing apparatus used for sealing thermoplastic films, such as polyethylene and polypropylene. Of course, pierced tubular casings can be produced by forming the kneaded protein dough into a sheet form, deep frying the sheet, and piercing the fried product in a conventional manner to form a tubular casing as discussed above.

A jointless aburage casing containing vegetables or other suitable foodstuffs can be made by applying a continuous coating of the kneaded protein dough over the foodstuff, such as with a suitable enrobing apparatus, and then frying the thus-coated product.

After the kneaded protein dough has been formed into the desired shape, the shaped product is deep fat fried in two stages. The temperature of the frying fat is about 100° to 135° C for the first stage and about 135° to 200° C for the second stage.

The tofu products produced by the method of the invention have a texture and mouth feel comparable with traditional fried tofu products.

The aburage casings produced by the invention have sufficient flexibility and strength making them adaptable for use as edible casings. Ganmodoki produced by the invention can be frozen without substantial denaturation and, upon being thawed, exhibits good texture and mouth feel even after being frozen for prolonged periods.

Without further elaboration, it is believed that one skilled in the art can, using the preceding description, utilize the present invention to its fullest extent. The following preferred examples are presented for the purpose of illustrating the invention and are not to be considered as limitations thereof.

EXAMPLE 1

2 kg of commercially available isolated soy protein (FUJIPRO-R, a sodium proteinate described in U.S. Pat. No. 3,607,860), 0.3 kg of potato starch and 6.6 kg of water were admixed and kneaded together to form a homogeneous mass. This mass was extruded through an annular orifice of an auger-type extruder having a 27 mm I.D. and 33 mm O.D. to form an endless tubular extrudate. The tubular extrudate was continuously and successively introduced in two frying oils. The temperature of the first and second frying oils were about 110° C and about 170° C, respectively, and the frying time in each was 3 minutes and 4 minutes, respectively. The resulting fried tubular product had a texture and flexibility acceptable for aburage. It was cut into 12 cm long sections which were stuffed with sliced burdock, noddle-like taste of arum ("itogonnyaku", a noodle of devils tongue made from an aroid plant, *Amorphophallus konjac*, consisting mainly of konjac mannan) and other vegetables. The opposite ends of each tubular section were sealed closed with a conventional heat sealing device used for sealing thermoplastic films. This unexpected capability of the fried aburage to be sealed in this manner makes it adaptable for high speed production of such stuffed foods.

EXAMPLE 2

A kneaded protein dough prepared in the same manner as in Example 1 was extruded through a rectangular orifice (3 mm × 25 mm) of an auger-type extruder and the extrudate was continuously introduced into a continuous deep fat fryer having an increasing temperature gradient, 100° C at the inlet and 150° C at the outlet. The fried product was cut into 16 cm long sections. Each fried section was slit open with a slender, flat spatula to form a hollow tubular body which was stuffed with a skinless sausage.

EXAMPLE 3

4 kg of dried soy milk having a moisture content of 5% and a soy protein content of 62% (based on the weight of the dry solids), 0.5 kg of salad oil and 6 kg of water were mixed together and kneaded for 30 minutes at 80° C in a Stephan mixer device. A small sample of the protein dough being formed was removed and tested for heat coagulability as described above and found to be heat coagulable. The kneaded protein dough was shaped by a calender device into a long, tape-like molding and immediately introduced into the continuous fryer described in Example 2. Sections of the fried products were slit open longitudinally with a slender, flat spatula to form hollow edible casings.

EXAMPLE 4

2 kg of isolated soy protein (FUJIPRO-R), 0.8 kg of fresh egg yolk, 0.8 kg of refined soybean oil and 5.4 kg of water were mixed together and kneaded at 20° C for 15 minutes to form a kneaded protein dough having the following composition, as parts by weight per 100 parts of water: 100 parts of water, 31 parts of soy protein, 2.2 parts of egg protein and 18 parts of oil. The kneaded protein dough was molded into a square sheet-like body (45 mm × 45 mm × 7.5 mm) and subjected to two successive stages of deep fat frying. The first frying stage was at a temperature of 110° C, the second frying stage was at a temperature of about 160° C and the frying time for each stage was 3 minutes. A novel egg-containing aburage having an eggy taste, an expanded texture and good luster was obtained.

As a control, aburage was prepared in exactly the same manner except the egg yolk was omitted. The kneaded protein dough had the following composition, as parts per weight per 100 parts of water: 100 parts of water, 33 parts of soy protein and 19 parts of soybean oil.

Tests were performed to determine the degree of expansion in the fried products. The fried egg-containing aburage and the control aburage had expanded volumes 2.6 times and 1.6 times, respectively, greater than their volumes prior to frying. Thus, it can be seen that the inclusion of an egg ingredient not only improves the flavor and luster of aburage but also produces a highly expanded product.

EXAMPLE 5

An acid-precipitated soy protein curd containing 92 weight % soy protein (based on the weight of the dry solids) and 75 weight % of moisture was neutralized to a pH 6.9 with an aqueous sodium hydroxide solution. 6 kg of this curd was kneaded for about 20 minutes in a kneading device provided with a steam jacket and heated until the temperature of the kneaded protein dough reached 90° C. A small sample of the dough was removed and tested as described above and found to be heat coagulable. After being allowed to cool, the protein dough was mixed with 2 kg of whole egg and 1 kg of refined soybean oil to form a uniform protein dough containing, as parts by weight per 100 parts of water: 100 parts of water, 23 parts of soy protein, 4 parts of egg protein and 21 parts of soybean oil. Minced carrot, sea tangle ("konbu") and sesame were admixed with this protein dough and the resultant dough was shaped into a circular disc form (6 cm O.D. and 1.8 cm thickness) and then fried as in Example 2 to provide a novel ganmodoki. A novel egg-containing ganmodoki having an eggy taste, an expanded texture and good luster was obtained. The product was stored in a freezer for 1 month and, after being thawed, exhibited a texture and chewiness substantially the same as that prior to freezing.

EXAMPLE 6

A protein dough was prepared by mixing and kneading together 2 kg of an isolated soy protein (FUJIPRO-R), 0.8 kg of salad oil, 0.2 kg of powdered egg yolk and 6.4 kg of water. The resulting protein dough was treated as in Example 4 to produce an egg-containing aburage having an expanded texture. The fried product had an expanded volume which was 2.6 times the volume prior to frying.

EXAMPLE 7

2 kg of an isolated soy protein (FUJIPRO-R), 1.6 kg of a salad oil, 0.3 kg of potato starch, 8 kg of water and a small amount of soy sauce ("shoyu") were mixed and kneaded together. A partially cooked foodstuff was prepared by mixing together sliced roots of burdock, itogonnyaku and several other vegetables. This foodstuff was covered with a coating of the protein dough with an automatic enrobing device and fried in a two-stage deep frying process, the first stage being at 110° C for 5 minutes and the second stage being at a temperature of 140° C for 4 minutes. The resulting enrobed product was further cooked and seasoned to provide a novel jointless aburage casing stuffed with the several food ingredients.

From the foregoing description, one skilled in the art can easily ascertain the essential characteristics of the invention, and without departing of the spirit and scope thereof, can make various changes and modifications to adapt the invention to various uses and conditions.

We claim:
1. A method for making a fried tofu product comprising
    kneading a mixture containing a heat coagulable soy protein and sufficient water to form a plastic-like, moldable soy protein dough,
    shaping said soy protein dough into the desired shape; and
    deep frying said shaped soy protein dough.
2. A method according to claim 1 wherein
    said deep frying step includes successive first and second stages with the temperature of the frying oil for the first stage being within the range of about 100° to 135° C and the temperature of the frying fat for the second stage being within the range of about 135° to 200° C.
3. A method according to claim 2 wherein
    said mixture contains about 15 to 45 parts by weight of said heat coagulable soy protein and 0 to 100 parts by weight of an edible oil or fat per 100 parts by weight of water.
4. A method according to claim 3 wherein
    said mixture contains about 20 to 40 parts by weight of said heat coagulable soy protein and about 11 to 60 parts by weight of an edible oil or fat per 100 parts by weight of water.
5. A product produced by the method of claim 4.
6. A method according to claim 3 wherein
    said mixture further includes an egg ingredient selected from the group consisting of egg white, egg yolk, whole egg or mixtures thereof, the amount of said egg ingredient, as egg protein, being about 1 to 10 parts by weight per 100 parts of water.
7. A method according to claim 6 wherein
    said fried tofu product is a tubular aburage casing which is produced by extruding said soy protein dough into a tubular extrudate during said shaping step.

8. A product produced by the method of claim 7.
9. A product produced by the method of claim 6.
10. A method according to claim 3 wherein said mixture further includes a small amount of a starch.
11. A method according to claim 10 wherein said starch is potato starch.
12. A method according to claim 3 wherein said heat coagulable soy protein is prepared from a soy proteinaceous material and including the step of heating an aqueous solution or slurry of said soy proteinaceous material to a temperature within the range of about 80° to about 140° C for about 1 second to about 30 minutes in a manner so as not to insolubilize or coagulate soy protein contained in said soy proteinaceous material, thereby making said soy protein heat coagulable.
13. A method according to claim 3 wherein said fried tofu product is aburage and said protein dough is formed into the desired shape for said aburage during said shaping step.
14. A product produced by the method of claim 13.
15. A method according to claim 3 wherein said fried tofu product is ganmodoki and said protein dough is formed into a circular disc shape desired for said ganmodoki during said shaping step.
16. A product produced by the method of claim 15.
17. A method according to claim 3 wherein said fried tofu product is a tubular aburage casing which is produced by extruding said soy protein dough into a tubular extrudate during said shaping step.
18. A method according to claim 17 including cutting said fried tubular aburage into sections of predetermined length, stuffing said section of aburage casing with a foodstuff, and sealing closed the opposite ends of said stuffed aburage section.
19. A method according to claim 18 wherein said sealing is provided by heat sealing.
20. A product produced by the method of claim 18.
21. A method according to claim 3 including coating a pre-shaped foodstuff with said soy protein dough during said shaping step.
22. A product produced by the method of claim 21.
23. A method according to claim 3 wherein said soy protein dough is formed into a thin sheet section during said forming step, and the resulting fried sheet is slit open with a slender, flat cutting means to form a hollow body adapted for encasing a foodstuff.
24. A product produced by the method of claim 3.

* * * * *